July 1, 1930.  V. MAUCK  1,769,590
THERMOSTATICALLY CONTROLLED GAS WATER HEATER
Filed Nov. 24, 1924    2 Sheets-Sheet 1
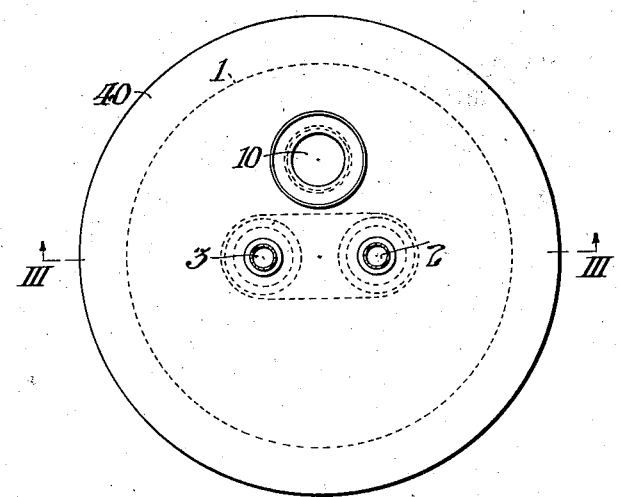
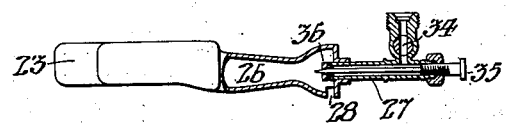
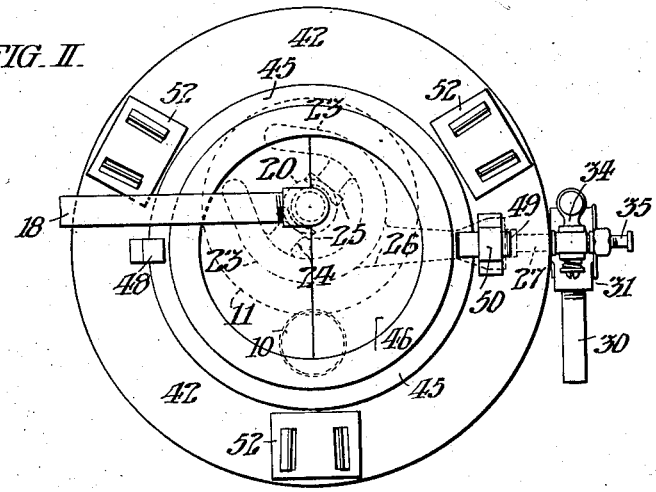
INVENTOR:
VICTOR MAUCK, July 1, 1930.  V. MAUCK  1,769,590
THERMOSTATICALLY CONTROLLED GAS WATER HEATER
Filed Nov. 24, 1924  2 Sheets-Sheet 2
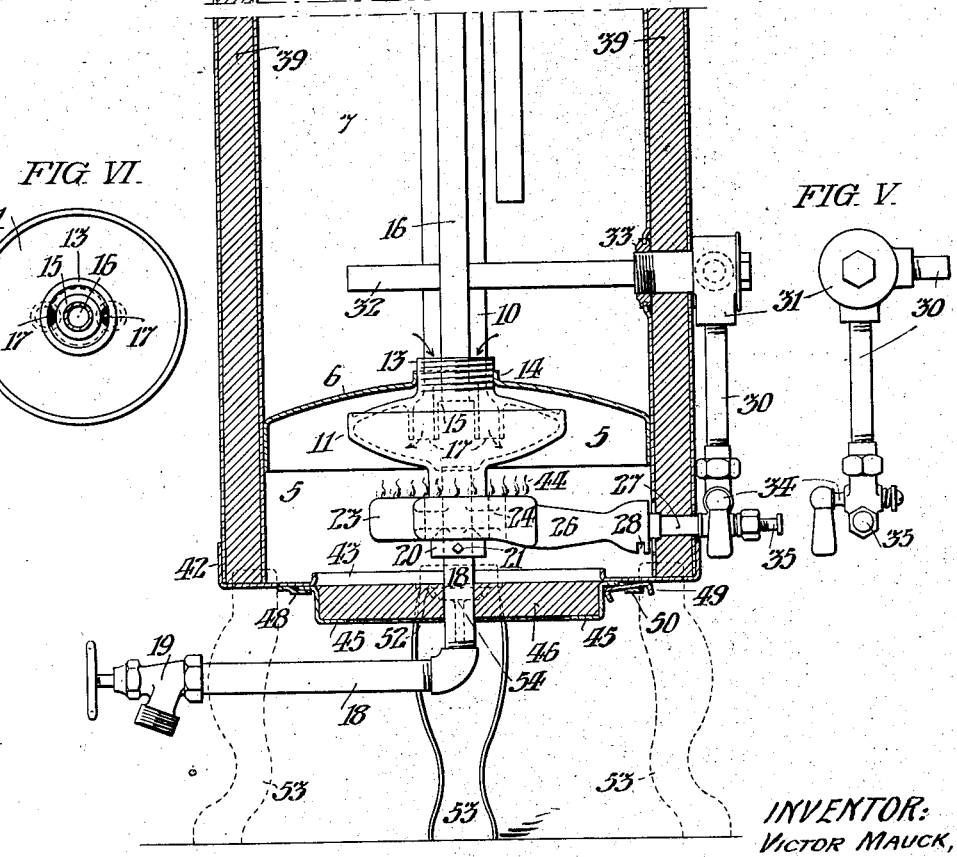

Patented July 1, 1930

1,769,590

UNITED STATES PATENT OFFICE

VICTOR MAUCK, OF MERION, PENNSYLVANIA

THERMOSTATICALLY-CONTROLLED GAS WATER HEATER

Application filed November 24, 1924. Serial No. 752,037.

My invention relates to such a heater adapted to be included in a house water supply system and comprising a container which is a hot water reservoir; constructed and arranged to automatically regulate and maintain a predetermined temperature of the water stored in said reservoir.

The form of my invention hereinafter described includes the combination with such a water container, having a combustion chamber at the bottom thereof; of a burner in that chamber arranged to heat the water in said container; an automatically, thermostatically, operative valve controlling a gas conduit leading to said burner; a needle valve between said conduit and said burner, whereby the flow of gas to said burner may be adjustably varied independently of said thermostatically controlled valve; a heat insulating covering for said container and combustion chamber, including a heat insulating closure for the bottom of said chamber; and means for removably securing said closure; whereby said chamber is substantially secluded from the outer atmosphere, air being admitted thereto only through the pores and interstices in and at said removable closure.

An adjunctive feature of my invention is a peculiar form of water spreader which is mounted in said combustion chamber between the bottom of said container and the top of said burner, and serves to facilitate the circulation of water in said container.

My invention includes the various novel features of construction and arrangement herein set forth.

Fig. I is a plan view of a gas water heater conveniently embodying my invention.

Fig. II is an inverted plan view of said heater.

Fig. III is a fragmentary vertical sectional view of said heater, taken on the line III, III in Fig. I.

Fig. IV is a fragmentary vertical sectional view of said burner and its appurtenances, including said needle valve.

Fig. V is a right hand side elevation of the gas conduit and thermostatically operative valve, as shown in Fig. III.

Fig. VI is a detached plan view of the water spreader, shown in Fig. III.

In said figures; the water container comprises the cylindrical metal shell 1, having the cold water inlet 2 and hot water outlet 3 at the top thereof, and the combustion chamber 5 at the bottom thereof. The diaphragm 6 forms the bottom closure of the water space 7 in said container 1, and the top of said combustion chamber. The flue 10 has its lower end connected with said diaphragm 6, and extends to the outer atmosphere, through said water container, parallel with, but eccentric to, the axis of said container shell 1.

The hollow oblate water spreader 11 is mounted in eccentric relation with said diaphragm 6 and extending below the latter in said combustion chamber; having at its upper portion, in co-axial relation, an externally screw threaded neck flange 13 extending in a corresponding opening surrounded by the flange 14 in said diaphragm 6. Said spreader has, in coaxial relation therewith, but eccentric to said container, the socket 15, engaged with the lower end of the hot water riser pipe 16 which terminates in spaced relation with the top of said container shell 1. Said spreader also has two diametrically spaced cold water inlet nozles 17, at respectively opposite sides of said socket 15 and in communication with the water space 7 through said spreader neck 13.

The water drain pipe 18 extends from the bottom of said spreader 11 to the exterior of said combustion chamber 5 where it is provided with the drain cock 19, through which sediment may be withdrawn from said spreader. The collar 20 encircles said drain pipe 18, and is provided with the set screw 21 to secure it in adjusted position. The gas burner includes the hollow horseshoe-shaped body 23, having the radially extending cross bars 24 forming axial bearings 25 embracing said drain pipe 18 and resting upon said collar 20. The mixing tube 26 extends from said burner body 23 in eccentric tangential relation thereto but in diametrical relation with said container 1 and combustion chamber 5, as best shown in Fig. II, and is slip fitted over the gas supply tube 27. The arrangement is such that said burner may be readily withdrawn and replaced laterally with respect to said pipe 18 and collar 20 which support it. As shown in Figs. III and IV; said mixing tube 26 is enlarged at its outer end and provided with the restricted air inlet 28 at the bottom thereof.

As shown in Figs. II, III and V; the gas conduit 30 leading to said burner 23 has the automatically, thermostatically, operative valve 31, arranged to control it in accordance with the expansion and contraction of a thermostatic element in the tube 32, which is rigidly connected with said valve. Although any suitable form of said valve 31 may be employed; that indicated is a specific form claimed by Arthur E. Paige in Letters Patent of the United States No. 1,542,573, granted June 16, 1925 for improvement in thermostatically controlled valves.

Said tube 32 extends diametrically in the water space 7 in said container shell 1, between said flue 10 and hot water riser pipe 16, and said valve 31 and tube 32 are detachably connected with said container shell 1 by the screw thread on the valve casing engaging the spud 33 in said shell.

I also find it convenient to provide said gas supply conduit 30 with the manually operative stop cock 34, leading to said conduit 27, between said automatic valve 31 and said burner 23; and also to provide the manually operative needle valve 35 in said conduit 27 between said stop cock 34 and said burner 23 in cooperative relation with an inlet port in the nozle 36 which is detachably connected with said conduit 27, in coaxial relation with said mixing tube 26.

It is to be understood that said stop cock 34 may be manually opened or closed, to either permit or prevent the passage of gas through said automatically, thermostatically, controlled valve 31; the function of the latter being to so regulate and control the rate of flow of gas to the burner 23 as to maintain the water in said container space 7 at a predetermined temperature for which said valve 31 is calibrated. The function and effect of said needle valve 35 is to permit the operator to clean, and vary the effective area of, the port surrounding the inner, conical, end of said valve 35, leading through said nozle 36 directly to the burner.

The heater chosen for illustration is of the type wherein a considerable volume of hot water is stored and normally maintained at a predetermined temperature, say 170° F.; as distinguished from heaters which have a minimum storage capacity and depend for their efficiency upon rapid heating of a minimum quantity of water upon demand. Therefore, it is important to conserve all of the heat generated by combustion of the gas at said burner 23, so as to minimize the quantity required. Therefore, I provide the heat insulating casing for said container and combustion chamber, and including the exterior shell 38, in concentric spaced relation with said container shell 1, and a refractory porous lining 39 for the same, which may be conveniently formed of involutely wrapped primarily plane, sheets of corrugated asbestos paper, which form a cylinder filling the space between said concentric cylindrical shells 1 and 38 as indicated in Fig. III. Said heat insulating casing includes the metallic top cover 40 having the refractory lining 41 which may be conveniently formed of the same material as the lining 39. Said casing shell 38 is also provided with the base cover 42 having the opening 43 in coaxial relation with said water container shell 1; affording access to the combustion chamber 5 to permit the operator to adjust and clean said burner 23.

However, if the burner 23 remained thus exposed; a considerable volume and pressure of gas would be required to maintain the burner lighted; whereas, I find that the desired temperature of the stored water can be maintained by the combustion of gas at such a slow rate that it would be impossible to thereby continuously maintain the flames 44 at said burner, if the latter were exposed to any direct air draft. Therefore, I provide a heat insulating closure for said opening 43, including the annular metal frame 45 containing the lining 46 of porous refractory material, conveniently such as above described. Said lining may be formed in semicircular sections, as indicated in Fig. II, to facilitate its application and removal with respect to said pipe 18. Said closure 45 is detachably connected with said base 42 by the clip 48 which is stationary upon said casing cover 42, and the slide catch 49 which is mounted to reciprocate through the stationary bight 50 upon said casing cover 42, diametrically opposite to said clip 48. Said base 42 has flanged plates 52 welded thereon to detachably engage the legs 53, by their respective wedge lugs 54.

It may be observed, that the construction and arrangement above described are such that the space in said combustion chamber 5 is substantially secluded from the outer atmosphere, by a porous medium excluding all forceful air drafts from said burner 23. The air necessary for combustion is let into said chamber 5, only through the minute pores of said lining 46 and interstices at the junctions of said closure 45 with said outer casing cover 42; so that small flames 44 may be continuously maintained upon said burner 23 in an atmosphere in which the movement of air is thus so diffused and controlled as to prevent extinction of such flames.

Said heater mechanism operates as follows: Said catch 49 being withdrawn and said bottom closure 45 removed, by lowering it upon the pipe 18 from the position shown in Fig. III, to afford access to the combustion chamber 5; and said needle valve 35 retracted to permit the passage of gas to the burner 23 through said nozle 36; the gas is turned on by opening the stop cock 34 to the position shown in Figs. III, IV and V, and the gas ignited at the outlets in the top of said burner 23 to form the flames 44. Thereupon, said closure 45 is replaced and secured as indicated in Fig. III and, by the operation of the thermostatic element 32, affected and effected by changes in the temperature of the water in the container chamber 7; more or less gas is permitted to pass through said supply conduit 30 and the valve 34 and around the vlave 35 to said burner 23 to heat the water in said spreader. Owing to the oblate form of said spreader 11, the hot water rises within it to the top thereof and flows upwardly through the riser 16 into the upper part of said container chamber 7; displacing a corresponding volume of cold water which flows downwardly through said spreader neck 13 and nozles 17 into contact with the hot lower wall of said spreader, thus circulating the water from said container 1 through said spreader until the desired temperature thereof is reached and maintained.

Of course, said thermostatically controlled valve 31 is operated to gradually diminish the volume of gas permitted to pass therethrough in accordance with the rise in temperature of the water in said space 7, until the minimum is reached which will maintain the desired temperature of the stored water under normal conditions. Under such conditions, the gas flames 44 remain continuously lighted at said burner 23 although they fluctuate in height in accordance with the volume of gas being consumed which, of course, depends upon the rate at which water is drawn from the space 7 with consequent lowering of the temperature thereof by the influx of cold water through the pipe 2. It may be observed that the latter terminates immediately above said thermostatic element 32 so that the latter is instantly affected by inflowing cold water.

In order to remove said burner 23, without removal of any of the pipe connections, it is only necessary to shift it to the left in Fig. III far enough to release the outer end of the mixing tube 26 from the gas supply tube 27. Said burner may then be partly turned around said drain pipe 18 and withdrawn from the latter.

Although I prefer to conserve the heat in the container and combustion chamber by means of metal members lined with porous refractory material, as described; any suitable heat insulating means may be employed.

It is the ordinary practice to provide gas water heaters with substantially large openings through which the outer atmosphere may freely communicate with the space in which combustion is affected; upon the theory that such provision for large volumes of inflowing air is essential for the proper operation of a gas burner. As far as I am aware, it is entirely novel and original with myself to seclude such a burner in a chamber from which the outer atmosphere is excluded except the diffused air entering said chamber thru the minute pores and interstices of said bottom closure, regardless of whether such seclusion is attained by refractory means or not.

Moreover, it is the usual practice to provide the mixing tubes leading to gas burners with a series of air inlets encircling the gas inlet; upon the theory that such an arrangement is necessary or desirable to facilitate the mixture of the air with the gas. However, the volume and rate of flow of gas in my improved heater above described, to maintain the stored water at the predetermined temperature aforesaid, is so slight that it was found in practice that such air inlets permitted a considerable portion of the gas to drift, backward, out of the air inlets above the gas inlet and to thus escape, unconsumed, through the flue. Therefore, I found that hermetically sealing the upper portion of the mixing tube 26 and providing a restricted air inlet 28 only at the bottom thereof prevented such escape and waste of gas and caused all of the gas passed by the automatically thermostatically controlled valve to be delivered through the burner and consumed thereat. Although I have found it convenient to form said inlet 28 as a slot extending sectorally in said tube 26, of course, it may be otherwise shaped; the essential feature being that means are provided to hermetically close the mixing tube around the gas inlet, except for a restricted air inlet below the gas inlet, and it may be observed that said air inlet is at a greater distance from the jet orifices in the top of the burner than said gas inlet.

Therefore, I do not desire to limit myself to the precise details of construction and arrangement herein set forth, as it is obvious that various modifications may be made therein without departing from the essential features of my invention, as defined in the appended claims.

I claim:

1. A combustion chamber for a gas burner, including a metallic shell having a flue outlet at the top thereof and a removable porous closure at the bottom thereof; constructed and arranged to limit the admission of air to such chamber to the minute openings, comprising pores and interstices in and at said removable closure; whereby the space in said combustion chamber is substantially secluded from the outer atmosphere and admission of excess secondary air prevented and the air to support combustion is admitted only through tortuous passageways which diffuse it so as to prevent extinction of minute gas flames in said chamber.

2. A structure as in claim 1, wherein the removable closure encircles a pipe leading into said combustion chamber.

3. A structure as in claim 1, wherein the removable closure encircles a pipe leading into said combustion chamber in eccentric relation with said chamber and closure.

4. In a gas water heater, the combination with a metal shell having a combustion chamber at the bottom thereof; of a flue extending from said combustion chamber to the outer atmosphere; a gas burner in said combustion chamber, having a large number of small flame orifices; a gas conduit leading to said burner through the side wall of said chamber; an annular plate forming the bottom wall of said combustion chamber and having an upturned flange exterior thereto; means carried by said bottom plate arranged to detachably secure a closure; said closure for said bottom plate comprising a metal frame containing porous refractory material whereby the space in said combustion chamber is substantially secluded from the outer atmosphere and admission of excess secondary air prevented, the air to support combustion being admitted solely at said closure and through its pores diffusing it and thereby preventing extinction of minute flames by such air.

5. In a gas water heater, the combination with a metallic shell; of a combustion chamber in the lower portion of said shell; a flue leading from said chamber to the outer atmosphere; a heat insulating casing inclosing said chamber shell and including an exterior metal shell in concentric spaced relation with said chamber shell and a lining of porous refractory material between said shells; an annular bottom plate supporting both of said shells and said lining and having an opening at the bottom thereof in concentric relation with and of smaller diameter than said combustion chamber; a closure for said bottom plate opening including an annular metal frame containing a lining of porous refractory material and having an annular flange; and means arranged to detachably hold said closure in closed position, including a slip stationary upon said bottom plate and a slide catch mounted to reciprocate upon said bottom plate diametrically opposite to said clip; whereby the space in said combustion chamber is substantially secluded from the outer atmosphere with which it is in communication only through the pores and interstices of said closure.

In testimony whereof, I have hereunto signed my name at Conshohocken, Pennsylvania, this 21st day of November, 1924.

VICTOR MAUCK.

CERTIFICATE OF CORRECTION.

Patent No. 1,769,590.                                Granted July 1, 1930, to

VICTOR MAUCK.

It is hereby certified that error appears in the printed specification of the above numbered patent requiring correction as follows: Page 3, line 16, for the misspelled word "vlave" read valve; page 4, line 32, claim 4, strike out the word "its", and line 53, claim 5, for "slip" read clip; and that the said Letters Patent should be read with these corrections therein that the same may conform to the record of the case in the Patent Office.

Signed and sealed this 23rd day of September, A. D. 1930.

(Seal)                                                               M. J. Moore,
                                                                     Acting Commissioner of Patents.